Oct. 14, 1969  M. BEZU  3,471,931
STABILIZED AIMING SIGHT
Filed Jan. 12, 1966  2 Sheets-Sheet 2

United States Patent Office 3,471,931
Patented Oct. 14, 1969

3,471,931
STABILIZED AIMING SIGHT
Maurice Bezu, 2 Rue Alphonse Kappler,
Asnieres, Haut-de-Seine, France
Filed Jan. 12, 1966, Ser. No. 520,175
Claims priority, application France, Jan. 16, 1965,
2,011; June 8, 1965, 19,884, 19,885, 19,886
Int. Cl. G01c 15/00, 15/12, 21/00
U.S. Cl. 33—46    7 Claims

ABSTRACT OF THE DISCLOSURE

A stabilized aiming sight fixedly mounted on a carrier vehicle and having, disposed between the area of view and an objective lens of said sight, a movable mirror mechanically coupled to a gyroscopic assembly having two degrees of freedom, and transmitting means between said gyroscopic assembly and said mirror comprising coupling means having pivots substantially devoid of friction and junctions substantially devoid of backlash, and also having a movable flywheel member pivotally mounted for rotation in reverse direction with respect to said mirror, thus constituting an inertia compensator for said mirror and the mechanical coupling element directly connected thereto.

---

This invention relates to an aiming sight suitable for use on all kinds of vehicles travelling on land, on water, in the air, or in extra-terrestrial space.

The ability to locate targets and the accurate long-range guidance of missiles directed at such fixed or moving targets from a moving vehicle call for observation apparatus providing great stability of the aiming device yet retaining the possibility of controlling changes in the sighting independently of vehicle motion in order to enable the image of a possibly remote target to be acquired and held still in the focal plane of the aiming sight.

Stabilized sighting devices utilized heretofore have included, in association with an optical sight aboard a vehicle, either an optical rectifying device which compensates for movement of the supporting vehicle, or a gyroscopically controlled reflector system which compensates for vehicle motion about a single axis.

The former-mentioned system has serious drawbacks from the point of view of stability and accuracy due to the evident lack of space in the sight and also to the fact that the compensating rectifier operates on the optical beam at a point situated ahead of the objective lens of the sight.

Although the latter-mentioned system is to be preferred, it restricts the use of the sighting device since it stabilizes it in one direction only. This results in great inaccuracy, to a degree dependent on the narrow field range of the optical sight and the high speed of flight of the missiles, especially when the target is very remote from the launching vehicle.

Although such poor stability is due mainly to the lack of stabilization about a second axis, it is also due to the moments of inertia of the reflector system's components and ancillaries which introduce parasite moments during changes in elevation as well as to the friction moments relative to the stabilizing gyroscope and to the loads carried by the gyroscope gimbals.

It is already known to resort to arrangements which utilize an optical sight associated with at least one movable correcting mirror located ahead of the objective lens of the aiming sight and which comprise a directional gyroscope supported in a universal mounting by a set of gimbals, of which one is rotatable about an elevation axis and the other about an azimuth axis. In this arrangement the system consisting of the gyroscope, the elevation gimbal and the elevation gimbal shaft, is connected through this shaft to the mirror located ahead of the objective lens of the optical sight, which mirror is rotatable about journals parallel to said elevation gimbal shaft responsively to a linkage system interconnecting said journals with said shaft and providing a reduction ratio of 1:2.

One object of the present invention is to improve the performance of a stabilizing system of the kind described hereinabove.

Another object of the invention is to ensure, through the medium of a supporting gyroscope with two degrees of freedom, in supplement to the degree of freedom corresponding to the rotation of the rotor, a greater apparent fixity of visible or invisible light rays issuing from any convenient source such as a laser in space oriented along the axis of sight.

A further object of the invention is to cause such a supporting gyroscope to be referenced either to a high quality datum defined by a pilot gyroscope or to manual controls for shifting the line of sight in azimuth and in elevation, said controls being provided to enable the stabilized sight to track the target when the same is moving across the field of view.

Yet another abject of the invention is to link the rates of traversing in elevation and in azimuth to the field of view of the sight in order to provide a visual impression of constant angular velocity irrespective of the degree of magnification. The change in magnification can be obtained by embodying in the aiming sight optical systems having either different or continuously variable focal lengths, for example, through a pancratic system of known construction.

Still another object of the invention is to eliminate the stability disrupting effects referred to by inserting, into the interconnections between the supporting gyroscope and the mirror, mechanical interlocks and electronic devices which respectively reduce backlash, compensate for inertias and ensure improved response.

The invention accordingly includes, in a system of the kind referred to and more particularly in the supporting gyroscope and the mirror, a drive mechanism substantially devoid of friction or backlash which is associated with means for compensating the kinetic inertias of the moving parts linked by said interconnection. The term "kinetic inertia" is intended to include inertia effects relative to the movements of the carrier vehicle.

The invention provides a further improvement in the form of a kinetic inertia compensator consisting of a motor rotor which, when energized, causes precession of the supporting gyroscope.

The invention likewise includes, in such interconnections, tracking members and means for referencing the positions thereof to the direct mechanical interconnecting members whereby to nullify the effects of friction in the bearings supporting said members.

Further advantageous particularities of the invention will become apparent from the description of preferred embodiments which follows with reference to the accompanying non-limitative exemplary drawing, in which.

Figure 1:
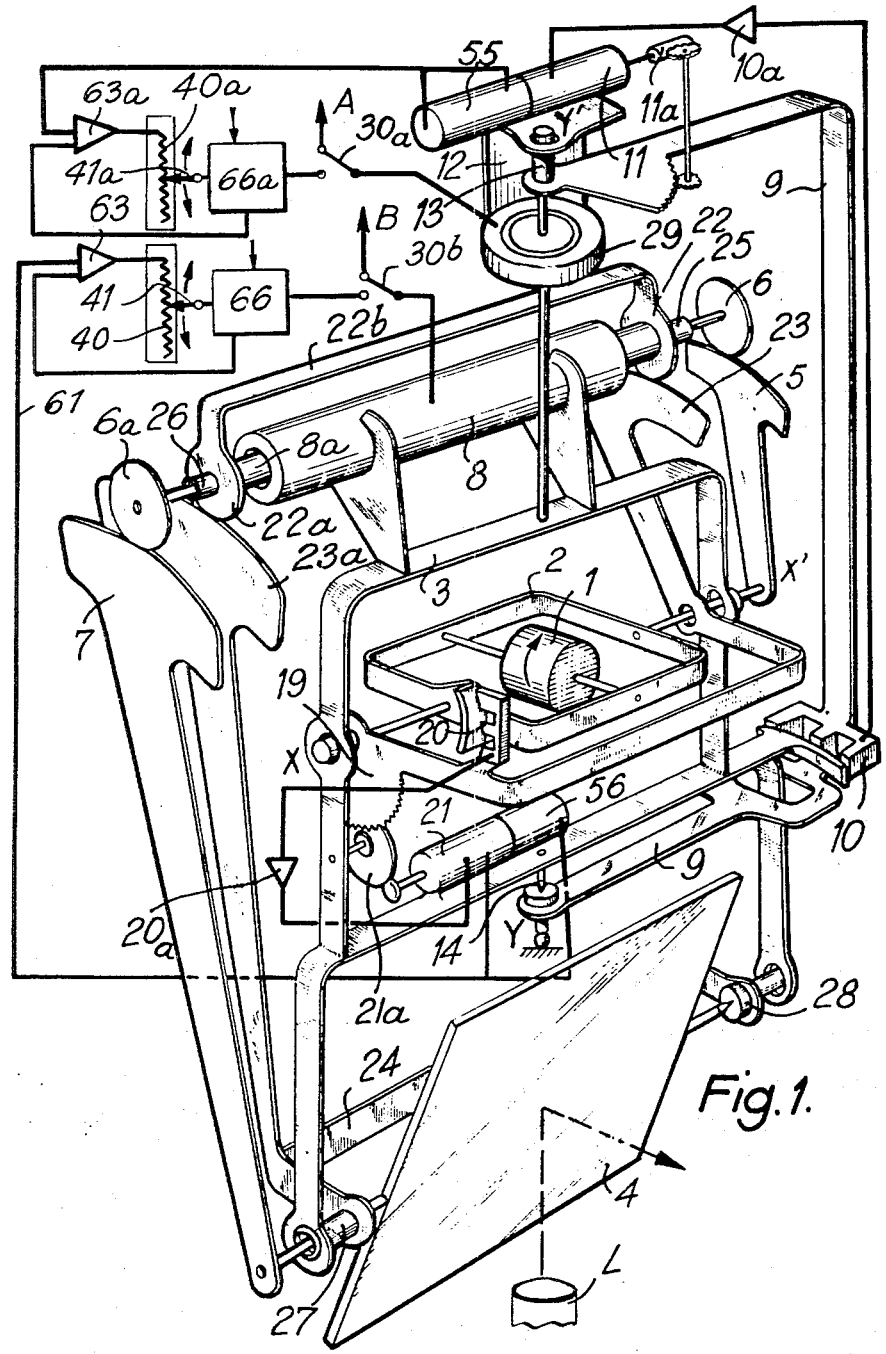
FIG. 1 is a schematic perspective view of the arrangement used for moving the mirror of a stabilized panoramic aiming sight.

The arrangement shown in the drawing includes a supporting gyroscope 1 with two degrees of freedom, the rotor of which is mounted in an elevation gimbal 2. This gimbal is carried on pivots and is adapted to rotate about a geometrical axis designated by the reference letters X–X'. These pivots are in turn supported by ball bearings in an outer azimuth gimbal 3 which is itself carried by pivots rotating in bearings enabling the entire assembly to rotate about axis Y–Y'. The axes X–X' and Y–Y' are absolutely perpendicular to each other.

Through the prongs of a fork forming an extension of gimbal 3 the latter supports the bearings for the pivots of a mirror 4 lying parallel to axis X–X', whereby mirror 4 is adapted to be rotatable not only on its own pivots but also about the axis Y–Y', opposite an aiming sight L (shown fragmentally only by its objective lens in the drawing). The aiming sight L may comprise any convenient known means for varying its focal length.

Mirror 4 is thus in direct coupled relation with gyroscope 1 in respect of motion about axis Y–Y', a coupling providing a reduction ratio of 1:2 being provided between mirror 4 and gyroscope 1 in respect of rotations of the shaft of gimbal 2 and the shaft of mirror 4. This latter-mentioned coupling includes a sector 5 fast with one pivot of gimbal 2 and engaging without friction or backlash with a pulley 6 fixedly mounted on a rotatable shaft carrying at its other end a further pulley 6a identical to pulley 6. Pulley 6a engages, without friction or backlash, a sector 7 angularly rigid with one of the pivots of mirror 4.

Figure 3:
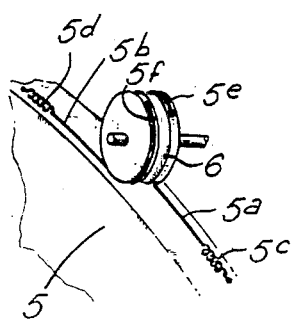
FIG. 3 is a schematic perspective detail view of the interconnection devoid of backlash and friction between two parts for coupling a supporting gyroscope to a mirror.

The interconnection, without backlash or friction, may comprise, on sector 5, two ties 5a and 5b (FIG. 3) wrapped about said sector and having their ends attached thereto through springs 5c, 5d respectively. The two ties are wound about pulley 6 in mutually spaced relationship to form individual loops 5e and 5f, the pulley being accordingly formed, if necessary, with two separate grooves. This eliminates backlash and friction since the ties are mutually spaced where they coil about the pulley. The mutual relationship of the pulley 6, the sector 5 and the ties is such that the traction forces exerted are tangential to the pulleys and the sector. These ties, which may be wires or tapes, may be made of metal or of any other convenient flexible non-stretching material.

The two pulleys 6 and 6a and the sectors 5 and 7 provide two reversals of the motion whereby rocking movement of mirror 4 about its pivots takes place in the same direction as gyroscope 1.

The rotor 8a of an electric motor 8 is coaxial with pulleys 6 and 6a. Alternatively, motor 8 may be a hydraulic or pneumatic motor.

When motor 8 is not energized, its rotor 8a acts as a flywheel, and its design characteristics are such (moment of inertia $J_1$ and minimum residual moments) as to ensure compensation for the kinetic inertias of the mirror and the coupling members as said flywheel and mirror pivot in opposite directions.

The relation to be satisfied in order to achieve such compensation of the kinetic inertias is:

$$\frac{I}{J_1+J_2}=n(n+2)$$

where $I$ is the moment of inertia of the mirror, $J_1$ the moment of inertia of the rotor of motor 8, $J_2$ the moment of inertia of the relay with its two pulleys 6, 6a and $n$ the reduction ratio between the shaft of mirror 4 and the shaft carrying pulleys 6, 6a.

In the arrangement shown in the drawing, each of the gimbals referred to is associated with a tracking gimbal, with azimuth gimbal 3 being associated with a gimbal 9 rotatably mounted through bearings on the same pivots, and elevation gimbal 2 being associated with an elevation tracking gimbal 19. A relative motion sensor 10 is interposed between gimbal 3 and gimbal 9, and a relative motion sensor 20 is similarly interposed between azimuth gimbal 2 and its tracking gimbal 19. These sensors may be differential electrical transformers of which the magnetic armature is rigid with gyroscope supporting gimbal and the wound armature rigid with the tracking gimbal.

Gimbal 9 may be driven, under the control of the signal from sensor 10 and amplified in an amplifier 10a, by a motor 11 carried on a support 12 rigidly connected to the vehicle. Through a mechanical transmission 11a, motor 11 rotates a toothed sector fast with gimbal 9. For reasons of sensitivity, the torque which this servo-motor 11 is capable of developing is greater than the sum of the opposing torques in the bearings used for the azimuthal axis Y—Y', and this limits and tends to cancel out any relative motion between gimbals 3 and 9. The absence of such relative motion means that the ball races in the bearings 13 and 14 through which follower gimbal 9 is mounted on the pivots of azimuth gimbal 3 introduced no opposing friction moments since the freedom to rotate which they afford is not used as they operate in the range of resilient deformation of the component parts of the balls and ball races.

Each of said bearings includes a cup-shaped ball race 15 which performs the dual functions of restraining, internally, the tip of the pivot supporting the gimbal 3 and, externally, the gimbal 9, the latter being in turn restrained inside an annular ball bearing 16 the outer race of which is slidably mounted in a housing in support 12. Bearings 15 and 16 are prestressed axially by a spring 17 the pressure of which can be adjusted by a screw 18 extending through support 12, whereby to eliminate axial and radial play.

It will readily be appreciated that any change of direction in the vehicle will result in a deviation between the vehicle, the tracking gimbal 9 and the supporting gyroscope 1, the latter remaining fixed in space. Any error in the mutual angular positions of tracking gimbal 9 and azimuth gimbal 3 will be detected by sensor 10, and the signals therefrom will be amplified in amplifier 10a and applied to motor 11 which will then reset gimbal 9 in a position in which the signal from detector 10 is nullified.

Similarly, pitching motion of the vehicle will produce a deviation between the vehicle, gimbal 19 and gyroscope 1. Any error in the relative angular positions of gimbal 19 and gimbal 2 will be detected by error sensor 20 and the signals therefrom will be amplified in an amplifier 20a and then applied to a motor 21 which is mounted on gimbal 3 and is effective in rotating gimbal 19 through mechanical reduction gearing 21a.

Figure 4:
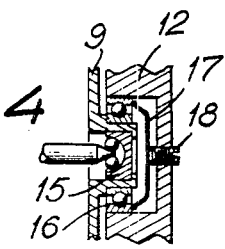
FIG. 4 shows schematically in section a prestressed dual bearing for carrying the component parts in such couplings.

Gimbal 19 is fast with a sector 23 similar to the sector 5 described precedingly. Sector 23 drives, through means similarly devoid of backlash or friction, a relay pulley 22 which is rigidly interconnected through a cross-member 22b to a second relay pulley 22a which likewise cooperates with a sector 23a similar to sector 7. Sector 23a is fast with a lever which is in turn rigid with a cross-member 24 forming a component of a tracking gimbal for mirror 4. The operation of this arrangement is identical to that of the precedingly described system and offers the same advantages. Similarly, for the same sensitivity reasons, the torque developed by motor 21 is greater than the sum of the friction moments in the ball races of bearings 25, 26 which support pulleys 22, 22a on the same shaft as pulleys 6, 6a, and in the ball bearings 27, 28 which support tracking the mirror gimbal found with crossmembers 24, sector 23a and corresponding lever on the mirror shaft, these several ball bearings being identical to that shown in FIG. 4.

The stator of torquer 8 is supported in yokes 8a on the upper cross-member of gimbal 3.

A torquer 29 is mounted on the Y—Y′ axis pivot.

The tracking motion of mirror 4 is imparted by speed controlling means which cause signals of suitable phase and amplitude to be applied to torquers 8 and 29, which signals may be generated by manually operated midpoint potentiometers to be described hereinbelow.

Changes in azimuth when tracking a target travelling transversely are obtained by applying a torque (proportional to the rate and direction of travel) to the shaft of elevation gimbal 2 through torquer 8. This torque will produce an azimuthal precession in gyroscope 1, thereby rotating, through the gimbal system, the mirror 4 and hence the sighting line.

Similarly, changes in elevation result in a torque proportional to the rate and sense of vertical travel of the target being applied to azimuth axis shaft Y—Y′ by torquer 29. This torque causes a precession in elevation of gyroscope 1 and rotates mirror 4 through the system of pulleys and sectors described precedingly.

The torques applied to the gyroscope axes are a quadratic function of the control information. Torque variations are obtained by applying varying electrical voltages simultaneously to the two windings of the torquers, the latter being of the quarter-phase type. Torque reversals are obtained by reversing the phase of the control voltage.

A tracking system as hereinbefore devised, the theory of operation of which will be described hereinafter, offers the advantages, on the one hand, of cancelling out residual moments in the absence of a control signal and, on the other, of providing a very large minimum-to-maximum-rate ratio.

Figure 2:
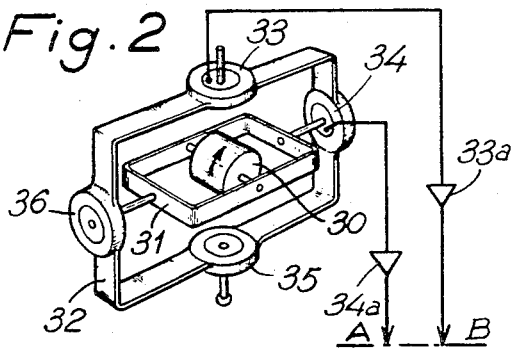
FIG. 2 shows in perspective a gyroscopic reference system connectable to the arrangement shown in FIG. 1 through the switching means shown in the figure.

Further, in order to improve stability of the aiming system, and of the mirror 4 in particular, supporting gyroscope 1 may be referenced with advantage in both azimuth and elevation to a high-quality datum defined by a pilot gyroscope, as shown in FIG. 2.

Changeover switches 30a and 30b are provided on the supply lines to torquers 29 and 8, respectively, for the dual purpose of tracking and stabilization. In one position of the switches, the latter cause the signals issuing from pilot gyroscope 30 to be applied to torquers 29 and 8 via connections designated on FIGS. 1 and 2 by A and B respectively. Pilot gyroscope 30 is mounted in an elevation gimbal 31 which is pivotally mounted in an outer azimuth gimbal 32 through very low friction ball bearings. On the azimuth and elevation shafts are respectively mounted sensors 33 and 34, the signals from which are transmitted via an amplifier 33a to torquer 8 and via an amplifier 34a to torquer 29.

The supporting gyroscope is monitored in azimuth as follows: the error detected by sensor 33 in the form of an electric signal is applied subsequent to amplification to elevation torquer 8. Switch system 30a, 30b permits a changeover from this servo-controlled monitoring mode to a manual control mode by connecting torque motors 29 and 8, respectively, to manual control devices to be described hereinafter. In both cases the torque applied by torquer 8 causes an azimuthal precession of gyroscope 1 and a corresponding shift in the sighting line.

A similar principle applies to gyroscope monitoring in elevation. The error detected by sensor 34 is applied subsequent to amplification to azimuth torquer 29. Switch system 30a, 30b permits changing over from servo-controlled monitoring to manual control as mentioned hereinbefore, and in both cases the torque exerted by torquer 29 causes a gyroscope precession in elevation and a corresponding shift in the sighting line.

Pilot gyroscope 30 may be associated with advantage with a torquer 35 on its azimuth shaft and with a torquer 36 on its elevation shaft whereby to enable gyroscope 30 to be monitored if need be, notably by means of a magnetic compass, an electromagnetic sensor or any other convenient instrument.

The pilot gyroscope 30 may be housed in the aiming sight casing, or remotely therefrom in a location shielded from possible perturbing effects.

These various arrangements enable the overall dimensions of the monitored gyroscope to be reduced to a minimum. It is to be noted that, during the servo-controlled monitoring phase, monitored gyroscope 1 acts in effect as an integrator and thus filters out unwanted influences, and that monitoring this gyroscope by means of a highly accurate reference unit ensures perfect stability at all times of the image received in the sighting device.

In a subsequent phase, as for instance in tracking a target, in order to permit manual control of the movements of mirror 4 required to track a target attempting to flee from the vehicle carrying the aiming system, the torquers 8 and 29 (which are asynchronous quarter-phase electric motors, though recourse may be had, for considerations of size and the obtainment of adequate output characteristics, to a plurality of electrically paralleled motors with a common rotor) are connected to other signal sources, in opposite fashion to FIG. 1.

Figure 5:
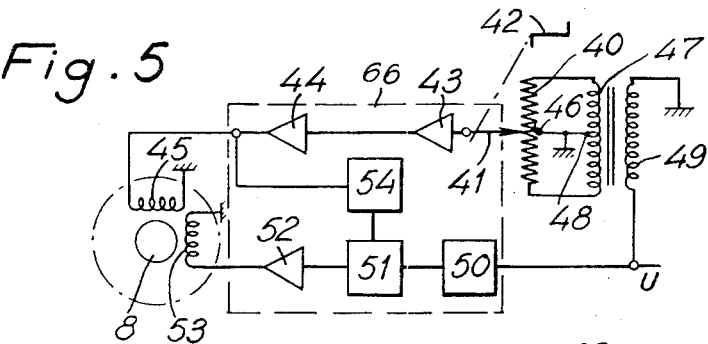
FIG. 5 is an electric wiring diagram for a torquer used in such a coupling.

As FIG. 5 clearly shows, the circuit diagram for a quarter-phase asynchronous motor such as motor 8 includes, as stated precedingly, a potentiometer the winding 40 of which is caused to be traversed by a slide 41 responsively to a manual control 42. Slide 41 is connected to an amplifier 43, followed by an amplifier 44 the output from which is connected to one of the stator windings 45 of motor 8, the other end of this winding being grounded.

The potentiometer winding 40 has its mid-point 46 grounded, and its ends are connected to the ends of a transformer secondary winding 47 the mid-point 48 of which is likewise grounded. The primary winding 49 of this transformer has one of its ends grounded and the other connected to an alternating current source U.

Source U is connected to a phase-shifter 50 feeding into an amplitude modulator 51 the output from which is connected to an amplifier 52 which in turn feeds the other stator winding 53 of motor 8, which winding is grounded.

The control input of modulator 51 is connected to a rectifier 54 which is supplied from the output end of amplifier 44.

The winding 45 can be energized via slide 41 with this arrangement, and a voltage of magnitude proportional to the displacement of slide 41 is delivered by amplifier 44 from the A.C. voltage from source U. There builds up in winding 53 a reference voltage which is produced from the A.C. voltage of source U, through modifications effected respectively by phase-shifter 50 (with a phase shift of $\pi/2$), amplitude modulator 51 and amplifier 52, said amplitude modulator having its action controlled by the voltage issuing from amplifier 44 and rectified in rectifier 54. It will be seen that the voltage phase-shift in coils 45 and 53 depends on the direction of displacement of slide 41 about the mid-point of potentiometer 40.

The advantage of this arrangement is that in the absence of activation, i.e., when slide 41 is at the mid-point of winding 40, neither of coils 45 and 53 receives any current, so that the modulation in modulator 51 produces zero amplitudes. As a result, the rotor of torquer 8 is subjected to no parasite torques that would otherwise be detrimental to stability of gyroscope 1 were the only stabilizing means.

Further, if during untilization of the sighting device with changeover switch system 30a, 30b in the manual control mode, the carrier vehicle is possessed of motion about the elevation and azimuth axes, then the relative motion between the stator and rotor of torquer 8 for example (due to movement of mirror 4 with respect to the situation of gyroscope 1) will produce an induced current in the torquer that will in turn give rise to a back electromotive force. The latter will cause a form of viscous friction between the stator and the rotor that is proportional to the rate of movement of the carrier vehicle. The device described with reference to FIGS. 1 and 6 enables such viscous friction to be nullified. (The means described hereinbelow with reference to torquer 8 are applicable likewise to torquer 29).

Figure 6:
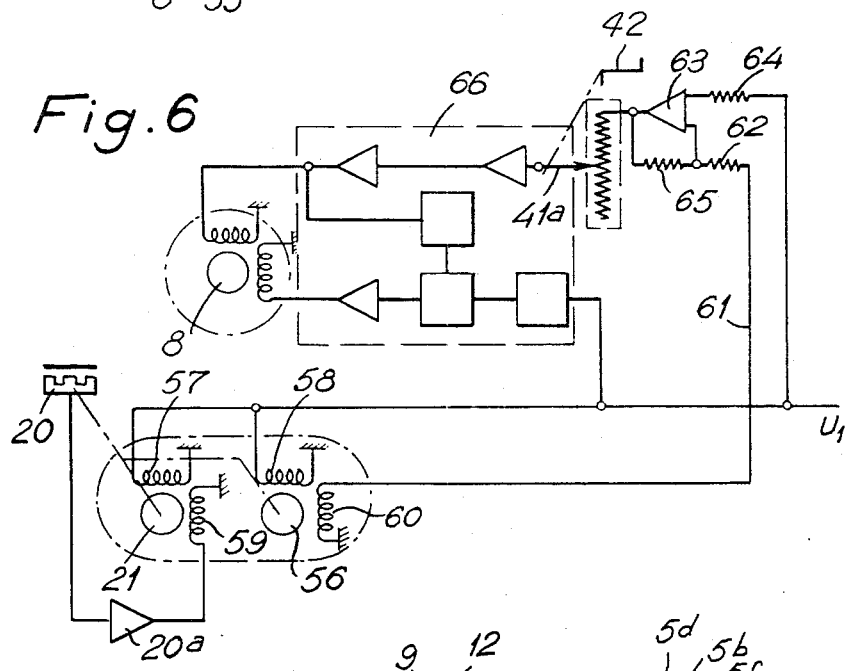
FIG. 6 is an alternative wiring diagram which includes means for compensating the effects due to the generation of back electromotive forces.

Tacho-generators 55 and 56 are accordingly associated with motors 11 and 21, respectively. FIG. 6 shows only one of the two corresponding circuit diagrams, but it is to be understood that the two diagrams are identical. Tacho-generator 56 is mechanically coupled to the motor 21 which resets the elevation tracking gimbal 19. Any relative movement between the stator and rotor of torquer 8 is repeated between the gyroscope elevation gimbal 2 and the associated tracking gimbal 19, as a result of which motor 21 resets tracking gimbal 19 and in so doing rotates tacho-generator 56 which in turn delivers a voltage proportional to the rate of displacement. One coil 57 of motor 21 has one end connected to a current source $U_1$ and the other grounded, and this applies also to one coil 58 of tacho-generator 56. The other coil 59 of motor 21 is connected through amplifier 20a to sensor 20. The second coil 60 of the tacho-generator has one end grounded while the other end 61 is led out and connected through a resistor 62 to one of the inputs of a differential amplifier 63 the other input of which is connected through a resistor 64 to source $U_1$; a resistor 65 interconnects the output from amplifier 63 with the first input thereof (to which resistor 62 is connected). The output from amplifier 63 is fed to a transformer/potentiometer system similar to that described with reference to FIG. 5, shown in more diagrammatic form in FIGS. 1 and 6. Slide 41a of this potentiometer system similarly feeds torquer 8 via amplifiers, and torquer 8 likewise receives an amplitude-modulated phase-shifted voltage which is amplified as described hereinabove by suitable apparatus (shown as being contained in the rectangle 66 in FIG. 6).

It will be seen that with this arrangement the voltage delivered by tacho-generator 56 is summed with supply voltage $U_1$ in differential amplifier 63, which amplifier is subjected to very substantial feedback through resistor 65, whereby the output voltage from differential amplifier 63 is complementarily amplitude-modulated by the voltage of tacho-generator 56 in such manner that the voltage applied to torquer 8 remains a strict function of the required degree of actuation, at the same time as the disturbing influences resulting from displacement caused by the movements of the carrier vehicle and possibly by tracking speed values are eliminated.

In this way the effect of the back electromotive forces referred to is nullified.

A similar system 66a (FIG. 1) is connected into the feed circuitry for torquer 29 is designated with the same reference characters with indices a and gives identical results.

The apparatus hereinbefore described thus makes it possible to eliminate friction in the couplings between the supporting gyroscope and the mirror in the bearings of said connections, to eliminate the disturbing influences of the kinetic inertias involved (by means respectively of servo-controlled tracking gimbals and a flywheel provided in the form of an electric motor rotor in one of said connections), to improve the stability of the sighting by caster-controlling the supporting gyroscope by means of a high-precision datum (which may itself be master-controlled during the surveillance phase), and lastly to eliminate the disrupting effects of carrier vehicle movement when tracking a target manually by means of servo-controls utilizing correcting tacho-generators, whereby an apparatus of greater overall accuracy and reliability is provided.

What I claim is:

1. A stabilized aiming sight comprising an objective viewing lens having an optical axis, a mirror positioned on the optical axis of the objective lens, a gyroscope rotor, first and second gimbals supporting said rotor for rotation about respective azimuth and elevation axes which are mutually perpendicular and permit universal movement of said rotor, a torque motor for torquing the second gimbal about the elevation axis, first means cooperating with said first gimbal for coupling said gimbals and said mirror such that rotation of said rotor about the azimuth axis is directly followed by said mirror and second means coupling said gimbals and said mirror and including reduction means by which rotation of the rotor is followed by rotation of said mirror in a 1:2 ratio, said second means including rotatable intermediate transmitting members one of which is rotatable in a direction opposite the mirror and provides compensation for the kinetic inertias of said movable mirror and the other transmitting members, said rotatable member serving as the kinetic inertia compensator comprising a flywheel, said transmitting members of said second means including two spaced pulleys, a shaft supporting said flywheel and mechanically interconnecting said pulleys, said pulleys effecting a first rotation direction reversal in the transmission of angular motion between the second gimbal and the mirror, said flywheel being the rotor of said torque motor.

2. An aiming sight according to claim 1 comprising servo-controlled tracking gimbals respectively engaged with said gimbals of the gyroscope rotor, said second means further effecting a second rotation direction reversal in said transmission and being mounted on said shaft and coupled with said mirror.

3. An aiming sight according to claim 2 comprising sensors each disposed between the gyroscope gimbals and the corresponding tracking gimbals, first and second servo motors for rotating the gyroscope rotor about respective azimuth and elevation axes, each sensor being electrically connected to a corresponding servo motor.

4. An aiming sight according to claim 3 comprising bearings for the tracking gimbals and for said second dual-reversal relay each respectively comprising a corresponding pivot, a ball-bearing supported by said pivot and interposed between said pivot and the tracking gimbal, and a ball-bearing interposed between said tracking gimbal and a support thereof, and axially effective resilient means acting on said two ball-bearings in series.

5. An aiming sight according to claim 1 comprising azimuth gimbal pivots of the rotor of the gyroscope, a second torque motor mounted on one of the azimuth gimbal pivots of the gyroscope rotor, and parallel-operated change-over switches, the two torque motors being respectively electrically connected to said parallel-operated change-over switches for selectively coupling said torque motors either to manually operated signal variators or to a reference gyroscope assembly, means for sensing the movements of a carrier vehicle on which the sight can be mounted, amplifiers respectively electrically connected to said sensing means, said amplifiers being electrically connected to said gyroscope torque motors whereby to apply signals thereto, and monitoring means for said reference gyroscope assembly.

6. An aiming sight according to claim 5, wherein said torque motors have a quarter phase stator, said manually operated signal variators respectively comprise a slide for energizing a first stator winding of a gyroscope torque motor, a potentiometer supplied from a source of alternating electric current and having a stator winding, said slide being connected to said stator winding, said stator having a second winding electrically connected to the same source, two amplification stages between said second winding and said source, a phase-shifter followed by an amplitude modulator between said source and second winding, said modulator being electrically connected through a rectifier to an output end of the second of said amplification stages, and an amplifier following said amplitude modulator.

7. An aiming sight according to claim 6 comprising a tacho-generator driven by a corresponding servo motor having a field winding connected to said source and a differential amplifier electrically connected to each potentiometer winding and having feedback which is electrically connected, on the one hand to said alternating electric current source, and on the other hand to the output of the tacho-generator.

References Cited

UNITED STATES PATENTS

| | | |
|---|---|---|
| 1,350,769 | 8/1920 | Bartlett. |
| 2,684,007 | 7/1954 | Newell _____ 88—2.4 |
| 2,705,371 | 4/1955 | Hammond _____ 33—49.3 |
| 3,326,619 | 6/1967 | Johnson et al. |

FOREIGN PATENTS 408,738    1/1945    Italy.

ROBERT B. HULL, Primary Examiner

U.S. Cl. X.R.

356—248